(12) United States Patent
Wang

(10) Patent No.: US 11,631,377 B2
(45) Date of Patent: Apr. 18, 2023

(54) TIMING CONTROLLER CONTROL METHOD AND TIMING CONTROLLER

(71) Applicants: BEIHAI HKC OPTOELECTRONICS TECHNOLOGY CO., LTD., Guangxi (CN); Chongqing HKC Optoelectronics Technology Co., ltd., Chongqing (CN)

(72) Inventor: Mingliang Wang, Chongqing (CN)

(73) Assignees: BEIHAI HKC OPTOELECTRONICS TECHNOLOGY CO., LTD., Guangxi (CN); Chongqing HKC Optoelectronics Technology Co., ltd., Chongqing (CN)

( * ) Notice: Subject to any disclaimer, the term of this patent is extended or adjusted under 35 U.S.C. 154(b) by 0 days.

(21) Appl. No.: 17/421,280

(22) PCT Filed: Jun. 10, 2020

(86) PCT No.: PCT/CN2020/095395
§ 371 (c)(1),
(2) Date: Jul. 7, 2021

(87) PCT Pub. No.: WO2020/249010
PCT Pub. Date: Dec. 17, 2020

(65) Prior Publication Data
US 2022/0157266 A1 May 19, 2022

(30) Foreign Application Priority Data
Jun. 10, 2019 (CN) .......................... 201910495080.5

(51) Int. Cl.
*G06F 13/42* (2006.01)
*G09G 3/36* (2006.01)
(Continued)

(52) U.S. Cl.
CPC ............... *G09G 3/36* (2013.01); *G06F 11/10* (2013.01); *G06F 12/0802* (2013.01);
(Continued)

(58) Field of Classification Search
CPC ........ G06F 13/00; G06F 13/364; G06F 13/38; G06F 13/4291; G06F 13/4282;
(Continued)

(56) References Cited

U.S. PATENT DOCUMENTS 5,892,933 A 4/1999 Voltz
9,740,658 B2 * 8/2017 Freudenberger .... G06F 13/4282
(Continued)

FOREIGN PATENT DOCUMENTS

CN 103472748 A 12/2013
CN 105096860 A 11/2015
(Continued)

OTHER PUBLICATIONS

International Search Report from International Application PCT/CN2020/095395 dated Sep. 16, 2020.

*Primary Examiner* — Dismery Mercedes
(74) *Attorney, Agent, or Firm* — Dorsey & Whitney LLP

(57) ABSTRACT

The present disclosure relates to a method for controlling a timing controller and a timing controller. The method for controlling the timing controller includes: acquiring a bus address in a bus signal transmitted over an I2C bus, the I2C bus being connected to the timing controller; if the timing controller determining that the bus address matches an address of the timing controller, acquiring data information in the bus signal; acquiring an address of a target function circuit according to the data information; generating and transmitting a query instruction to a memory according to the address of the target function circuit, and receiving switch control data corresponding to the target function
(Continued)

circuit fed back by the memory; controlling, according to the switch control data, a switch connected to the target function circuit to be turned on.

16 Claims, 11 Drawing Sheets

(51) Int. Cl.
*G06F 13/40* (2006.01)
*G06F 13/38* (2006.01)
*G06F 12/0802* (2016.01)
*G06F 11/10* (2006.01)

(52) U.S. Cl.
CPC ............ *G06F 13/38* (2013.01); *G06F 13/404* (2013.01); *G06F 13/4022* (2013.01); *G06F 13/4282* (2013.01); *G06F 13/4291* (2013.01); *G09G 2310/08* (2013.01); *G09G 2320/02* (2013.01); *G09G 2320/0666* (2013.01); *G09G 2330/021* (2013.01)

(58) Field of Classification Search
CPC .... G06F 13/4022; G06F 13/40; G06F 13/404; G06F 12/0875; G06F 12/0802; G06F 12/0831; G06F 11/10; G09G 5/395; G09G 3/2096; G09G 2370/04; H04L 12/403
See application file for complete search history.

(56) References Cited

U.S. PATENT DOCUMENTS

| 11,024,383 | B2* | 6/2021 | Her | G11C 16/10 |
| 2005/0015561 | A1* | 1/2005 | Matsuda | G06F 13/24 |
| | | | | 711/213 |
| 2006/0044295 | A1* | 3/2006 | Yu | G09G 3/2096 |
| | | | | 345/204 |
| 2011/0302351 | A1* | 12/2011 | Aybay | H04L 12/403 |
| | | | | 711/E12.002 |
| 2012/0299974 | A1* | 11/2012 | Park | G09G 3/3688 |
| | | | | 345/690 |
| 2016/0321208 | A1* | 11/2016 | Park | G06F 12/0246 |
| 2017/0032746 | A1* | 2/2017 | Chen | G09G 3/2096 |
| 2017/0132165 | A1* | 5/2017 | Uekuri | G06F 13/4282 |
| 2019/0287577 | A1* | 9/2019 | Mori | G06F 13/4022 |
| 2019/0385547 | A1* | 12/2019 | Chen | G09G 3/2092 |

FOREIGN PATENT DOCUMENTS

| CN | 105957491 A | 9/2016 |
| CN | 106847163 A | 6/2017 |
| CN | 109410824 A | 3/2019 |
| CN | 109509442 A | 3/2019 |
| CN | 109658887 A | 4/2019 |
| CN | 109859684 A | 6/2019 |
| CN | 110223652 A | 9/2019 |

* cited by examiner

TIMING CONTROLLER CONTROL METHOD AND TIMING CONTROLLER

CROSS-REFERENCE TO RELATED APPLICATIONS

This application is a U.S. national stage application of PCT International Application No. PCT/CN2020/095395 filed on Jun. 10, 2020, which claims priority to Chinese Patent Application No. 2019104950805, filed with the Chinese Patent Office on Jun. 10, 2019 and entitled "METHOD FOR CONTROLLING TIMING CONTROLLER, TIMING CONTROLLER AND DRIVE CIRCUIT", each of which is incorporated herein by reference in its entirety.

TECHNICAL FIELD

The present disclosure relates to the field of display technology, and more particularly, to a method for controlling a timing controller and a timing controller.

BACKGROUND

The statement herein merely provides background information related to the present application, and does not necessarily constitute the prior art.

The liquid crystal TV has a lightweight, a thin thickness, a small power consumption, and has been widely used. In a common driving structure of a liquid crystal panel, display data is generally processed by a Timing Controller (TCON) on a Printed Circuit Board (PCB), and a Pulse-width modulation Integrated Circuit (PWM IC) provides a driving power supply, and a Gamma Integrated Circuit (Gamma IC) provides a gamma voltage for driving the liquid crystal cell.

Owning to the development of chip digitization, currently, the timing controller and the gamma chip are connected together through an Inter-Integrated Circuit (I2C) bus. It is convenient to perform a corresponding read operation on any chip through operation I2C. However, the problem that can easily occur in this connection manner is that, when the user operates the gamma chip, the operation of the timing controller may also be affected. As a result, the switch inside the timing controller is mistakenly turned on. As a result, the workload of the timing controller increases, the current output by the power supply circuit connected to the timing controller suddenly increases, and the output voltage fluctuates abnormally. The abnormality of operation of the chip and the abnormality of display are further caused.

SUMMARY

Based on the above, embodiments of the present disclosure provide a method for controlling a timing controller and a timing controller.

On one hand, embodiments of the present disclosure provide a method for controlling a timing controller, including:

acquiring a bus address in a bus signal transmitted over an I2C bus, the I2C bus being connected to the timing controller;

if determining that the bus address matches an address of the timing controller, acquiring data information in the bus signal;

acquiring an address of a target function circuit according to the data information;

generating and transmitting a query instruction to a memory according to the address of the target function circuit, and receiving switch control data corresponding to the target function circuit fed back by the memory;

controlling, according to the switch control data, a switch connected to the target function circuit to be turned on, so that the target function circuit acquires operation parameters of the target function circuit stored in the memory through the corresponding switch.

The timing controller is powered by a power supply circuit, the timing controller includes a plurality of function circuits, and the target function circuit is a controlled function circuit indicated by the bus signal.

According to the method for controlling the timing controller provided in the embodiment of the present disclosure, by detecting the address of the signal transmitted over the I2C bus automatically, and the switch of the target function circuit corresponding to the address inside the timing controller is controlled to be turned on. The incorrect operating of the timing controller caused by the operation of the gamma chip and other components is avoided. In addition, the fluctuation of the output voltage of power circuit caused by the full operating of the function circuits inside the timing controller when there is a signal on the I2C bus is avoided. The stability of the power circuit is improved and the display effect is further improved.

On the other hand, embodiments of the present disclosure provide a timing controller configured to connect to an I2C bus, including: a processor, a memory, a plurality of switches and a plurality of function circuits; the processor and each of the function circuits are configured to be connected to a power supply circuit;

the memory stores switch control data for instructing to control an on or off state of each switch and an operation parameter of each function circuit;

the processor is connected to a first access terminal of the memory;

each function circuit is connected to a second access terminal of the memory through a one-to-one corresponding switch;

the processor is configured to execute the processing of the above-described method for controlling a timing controller.

DETAILED DESCRIPTION OF THE EMBODIMENTS

For ease of understanding of the present disclosure, the present disclosure will be described more fully hereinafter with reference to the accompanying drawings. Preferred embodiments of the present disclosure are given in the accompanying drawings. However, the present disclosure may be implemented in many different forms and is not limited to the embodiments described herein. On the contrary, the purpose of providing these embodiments is to make the present disclosure more thorough.

It should be noted that when one element is considered to be "connected" to another element, it may be directly connected to and integrated with the other element, or there may be a centering element at the same time. As used herein, the terms "mounted", "an end, "another end" and similar expressions are for purposes of illustration only.

Unless defined otherwise, all technical and scientific terms used herein have the same meaning as commonly understood by those skilled in the art to which this disclosure pertains. The terms used herein in the description of the present disclosure are for the purpose of describing particular embodiments only and are not intended to be limiting of the present disclosure. As used herein, the term "and/or" includes any and all combinations of one or more related listed items.

Figure 1:
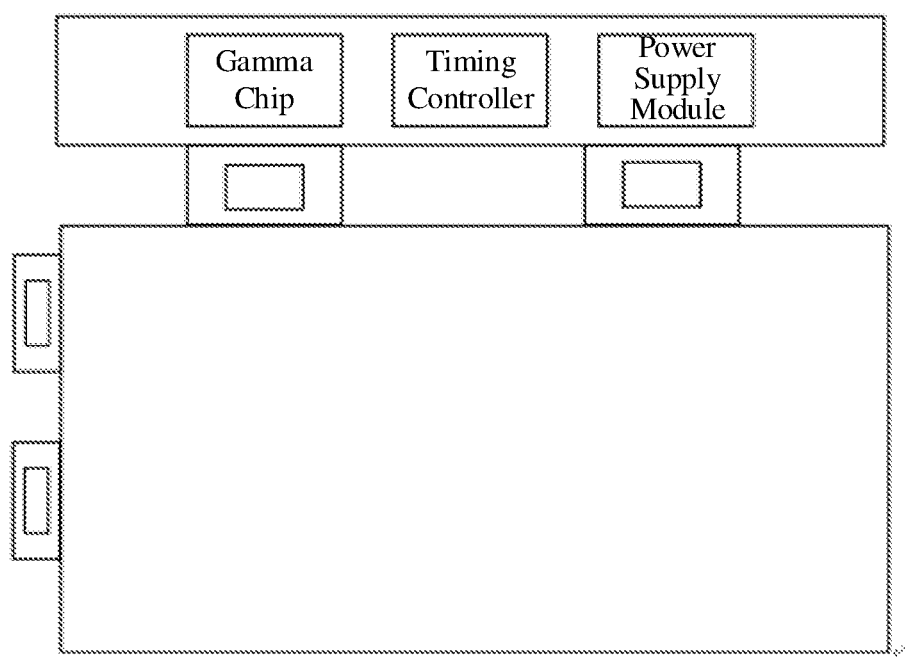
FIG. 1 is a schematic diagram of a driving architecture of a liquid crystal panel.
Figure 2:
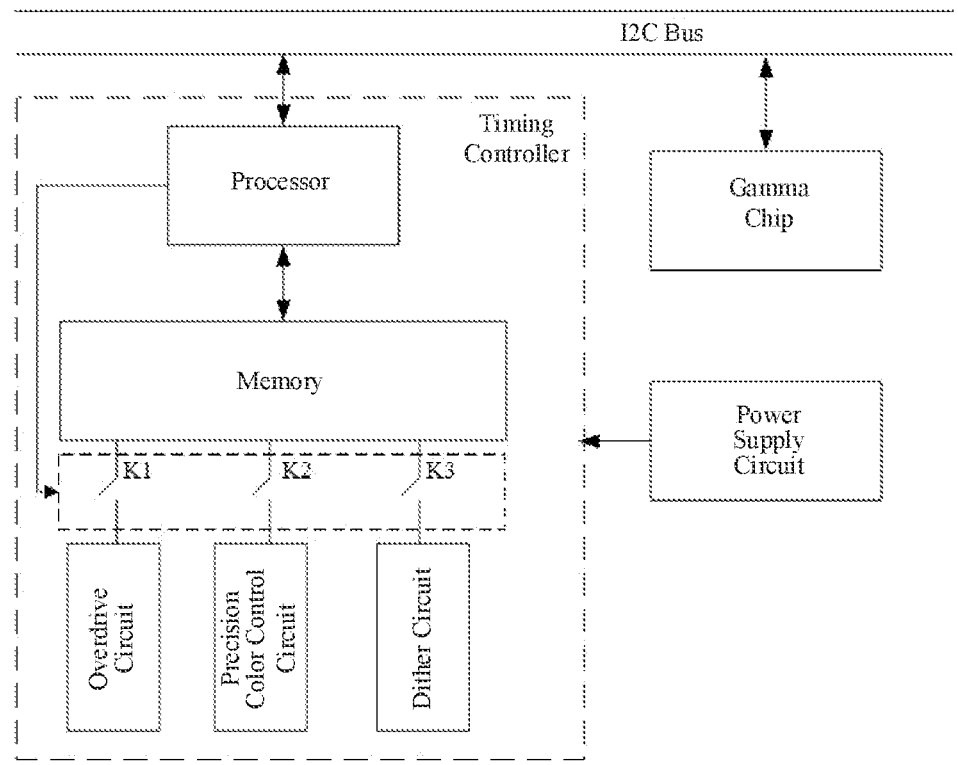
FIG. 2 is a structural schematic diagram of a drive circuit in an exemplary technology.

FIG. 1 is an exemplary driving architecture of a liquid crystal panel. The design architecture of the drive circuit in the exemplary technique is shown in FIG. 2. When there is an operation on the I2C bus (a simple, bidirectional two-wire synchronization serial bus developed by Philips, Inc.), and when the internal I2C slave (I2C bus slave device interface) detects an operation, a control signal for controlling each switch is activated, and thus all of the switches K1, K2 and K3 are simultaneously switched on, so that an Over-actuated (OD) circuit, an Advanced Color Control (ACC)/automatic chromaticity control) circuit, and a Dither circuit inside the timing controller can read the look-up table. According to such a design, the internal switch can be switched on in advance, facilitating the operation of the timing controller. However, the three circuits are turned on simultaneously, which causes the workload of processing chips inside the timing controller to increase drastically, the current of the power supply VDD consumed will suddenly increase, and the voltage VDD output by the power supply circuit is easily unstable, which causes an abnormal operating of the power supply circuit, and thus a display abnormality occurs.

Figure 3:
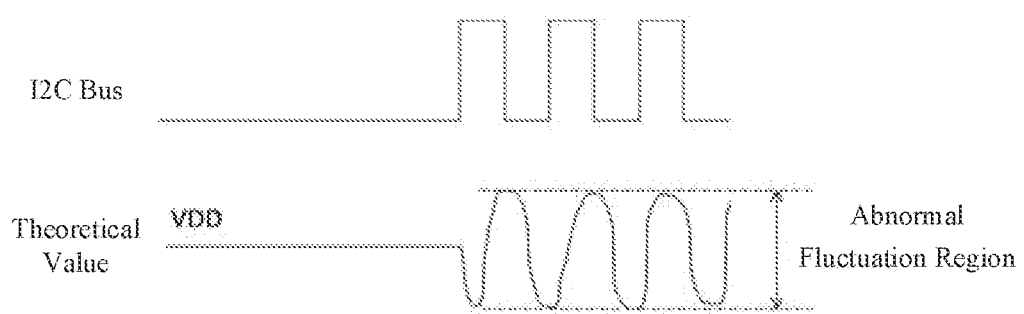
FIG. 3 is a schematic diagram of a waveform of a voltage of a power supply circuit in an exemplary technology.

As shown in FIG. 3, when the user transmits a signal to the gamma chip, that is, there is an operation on the I2C, the VDD, which is originally very stable, will enter the abnormal fluctuation region due to the sudden increase of the current.

Figure 4:
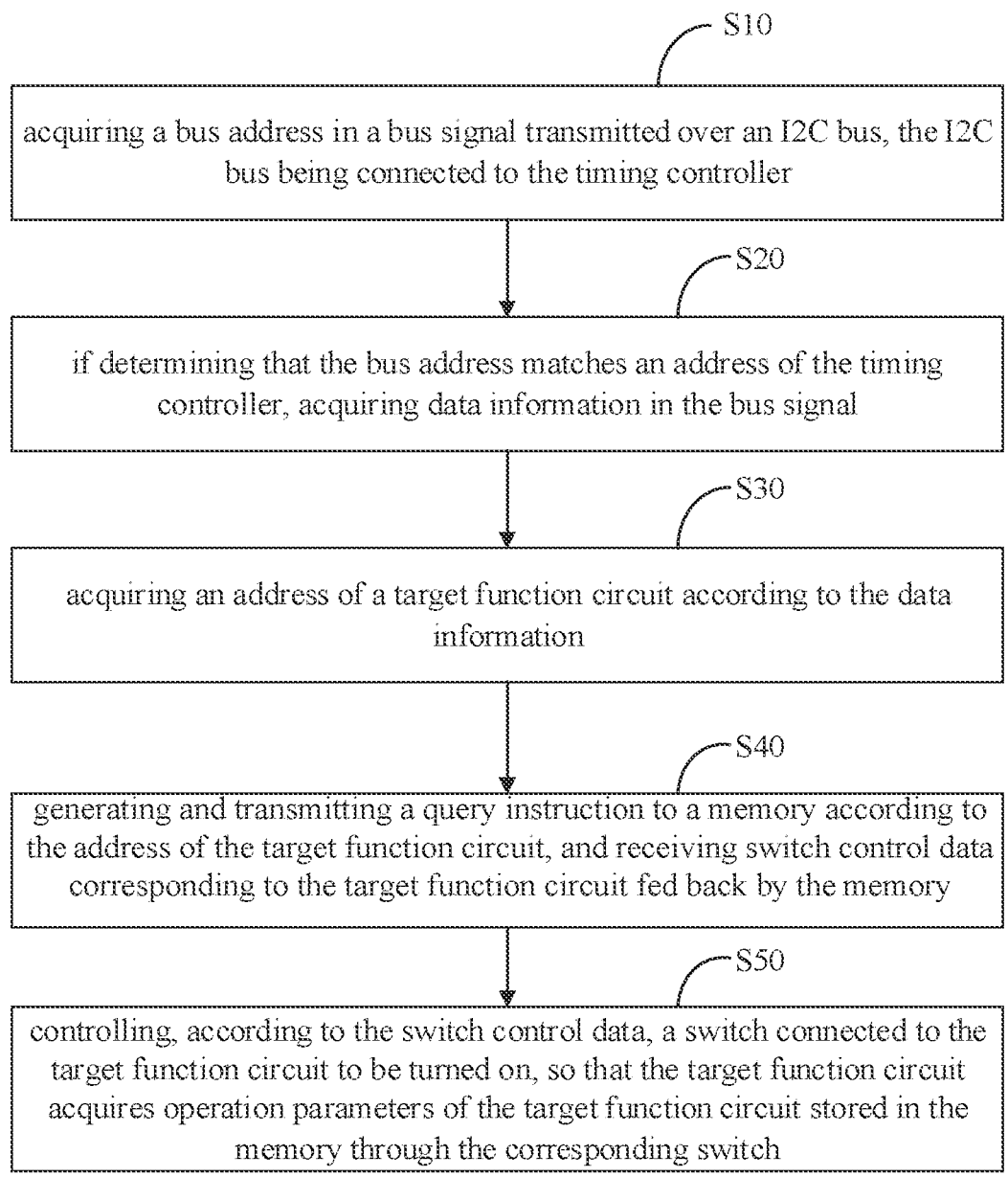
FIG. 4 is a flowchart of a method for controlling a timing controller according to an embodiment.

As shown in FIG. 4, an embodiment of the present disclosure provides a method for controlling a timing controller, including the following.

In S10, a bus address in a bus signal transmitted over an I2C bus is acquired, and the I2C bus is connected to a timing controller.

In S20, if determining that the bus address matches the address of the timing controller, data information in the bus signal is acquired.

In S30, an address of a target function circuit is acquired according to data information.

In S40, a query instruction is generated and transmitted to a memory according to the address of the target function circuit, and switch control data corresponding to the target function circuit fed back by the memory is received.

In S50, a switch connected to the target function circuit is controlled to be turned on according to the switch control data, so that an operation parameter of the target function circuit stored in the memory is acquired by the target function circuit through the corresponding switch.

The timing controller is powered by the power supply circuit, the timing controller includes a plurality of function circuits, and the target function circuit is a controlled function circuit indicated by a bus signal.

The I2C bus is a simple bidirectional synchronous serial bus developed by Philips. It only requires two wires to transmit information between the devices connected to the bus. Each device on the bus has a unique address, and according to whether each device is used for transmitting data or receiving data, each device on the bus may be divided into a master device and a slave device, and the master device is used for starting the bus to transmit data, and generating a clock to start the transmission of the devices, and at this time, any addressed device is considered as a slave device (for example, a controlled function circuit in the foregoing timing controller). The data information is data for indicating the operating of the slave device that is continuously transmitted after the addressing of the master device successfully and receiving the response signal fed back by the corresponding slave device. Determining that the bus address matches the address of the timing controller may be determining whether the valid bit data other than the starting bit in the address signal transmitted over the bus is consistent with the address of the timing controller. The target function circuit is one or more of the function circuits in the timing controller, and the target function circuit is an object to be controlled by data information in the bus signal. The switch control data is data corresponding to an address of each target function circuit and used for indicating a switch-off state of each switch corresponding to each function circuit, and the switch control data is stored in the memory.

Specifically, as shown in FIG. 2 and FIG. 4, in order to avoid the timing controller being mistakenly triggered when there is an operation on the bus, which causes fluctuation of the output voltage of the power supply circuit, a bus address in a bus signal transmitted over an I2C bus is firstly acquired; whether the bus address matches the address of the timing controller is determined; if determining that the addresses are matched, it indicates that the timing controller is an addressed slave device, and the data information part in the bus signal is further acquired, and this part of information is parsed to obtain the address of the target function circuit. The parsing process may be segmented according to each byte. Then, the 8-bit data in each byte is then converted to an address identifiable inside the timing controller (e.g. consistent with the system method adopted by the address of the function circuit in the timing controller). Further, according to the obtained address of the target function circuit, a query instruction is generated and transmitted to the memory, and switch control data corresponding to the target function circuit is acquired by accessing the memory. The query instruction may be an instruction including the address of the target function circuit. After receiving the switch control data fed back by the memory, the corresponding switch is controlled to be turned on according to the data, so that the target function circuit is connected to the memory, and the target function circuit acquires its operation parameter from the memory and enters the operating state. According to the method for controlling the timing controller provided by the embodiment of the present disclosure, an address matching determination is performed firstly, and when the timing controller is a controlled slave device, operation allocation inside the timing controller is then performed. According to an address of a target function circuit in data information, a switch connected to a corresponding circuit is controlled to be turned on, and a target function circuit is controlled to enter an operating state. Through the above processing, the stability of the power supply circuit connected to the timing controller is improved, so that the operation stability of each chip is improved, and the display quality is improved without being abnormal due to the fluctuation of the operating voltage. The power supply circuit may be a Pulse-width modulation Integrated Circuit (PWM IC) power supply.

According to the method for controlling the timing controller according to an embodiment of the present disclosure, whether the address in the signal transmitted by the I2C bus matches the address of the timing controller is determined; that is, whether the address is to be transmitted to the timing controller is determined; if yes, data information subsequently transmitted by the I2C bus is received and the next operation is executed, and the address of the target function circuit is acquired from the data information; and the query instruction is generated according to the address of the target function circuit. By accessing the memory, switch control data corresponding to the target function circuit in the timing controller is found. Then, according to the switch control data, the switch connected to the target function circuit is controlled to be turned on. For a function circuit not corresponding to the bus address, the switch connected thereto does not execute a closing operation, so that only the target function circuit is connected to the memory, and the target function circuit acquires its operation parameter from the memory, and starts operating. According to the method for controlling the timing controller provided by the embodiment of the present disclosure, an address in a signal transmitted over an I2C bus may be automatically detected. The switch of the target function circuit in the timing controller corresponding to the address is controlled to be turned on, so as to avoid the incorrect operating of the timing controller caused by the operation of gamma chip and other components. In addition, when there is a signal on the I2C bus, the fluctuation of the output voltage of the power circuit caused by the full operation of the function circuits inside the timing controller is avoided. The stability of the power supply circuit is improved, and the display effect is further improved.

Figure 5:
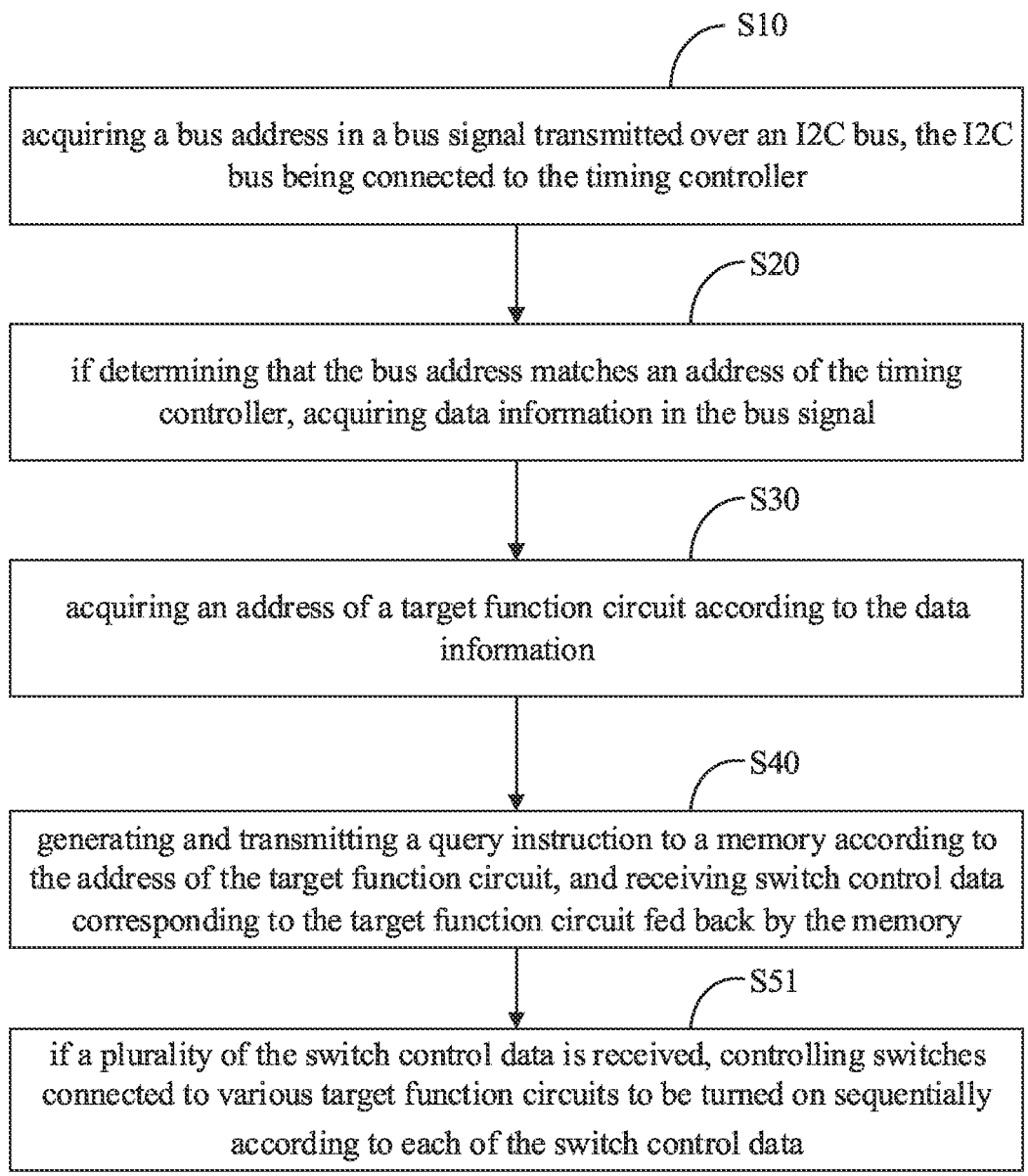
FIG. 5 is a flowchart illustrating a switch closing process for controlling a connection with a target function circuit according to switch control data according to an embodiment.

In one embodiment, as shown in FIG. 5, the switch connected to the target function circuit is controlled to be turned on according to the switch control data includes the following.

In S51, if a plurality of switch control data is received, switches connected to various target function circuits are controlled to be turned on sequentially according to each switch control data.

In order to further reduce the influence on the output voltage of the power circuit when the timing controller operates, when the switch control data is received, that is, when a plurality of target function circuits are needed to be controlled, the switches are controlled to be turned on sequentially according to the switch control data, thereby avoiding overload caused by simultaneously closing the plurality of switches, and thus causing the fluctuation of the output voltage of the power circuit.

According to the method for controlling the timing controller according to an embodiment of the present disclosure, when it is detected that the bus address matches a plurality of function circuit addresses inside the timing controller, a plurality of switch control analog signals are acquired from the memory correspondingly. In order to further reduce the influence on the power supply circuit caused by the simultaneous activation of a plurality of function circuits, the processor controls the corresponding switches to be turned on according to the switch control analog signals sequentially according to a certain sequence. It is ensured that only one switch is turned on at the same time to avoid unstable power supply voltage caused by excessive power consumption, and thus a high-quality display device and display effect are provided.

In one embodiment, the switch control data is stored in a look-up table, and the look-up table represents a corresponding relationship between the address of each function circuit and the switch control data. In order to facilitate the query, the switch control data is stored in the look-up table, and the look-up table is a table capable of representing the corresponding relationship between the address of each function circuit and the switch control data. Specifically, the content stored in the table may be a table with a one-to-one correspondence between the address of the function circuit and the switch control data, and the query instruction may include the address of the target function circuit. Alternatively, the table may be a table with a one-to-one correspondence between a number of a predefined function circuit and the switching control data, and at this time, the process of generating the query instruction according to the address of the target function circuit may be: acquiring the number of the function circuit according to the address of the target function circuit firstly, and then generating the query instruction including the number information.

Figure 6:
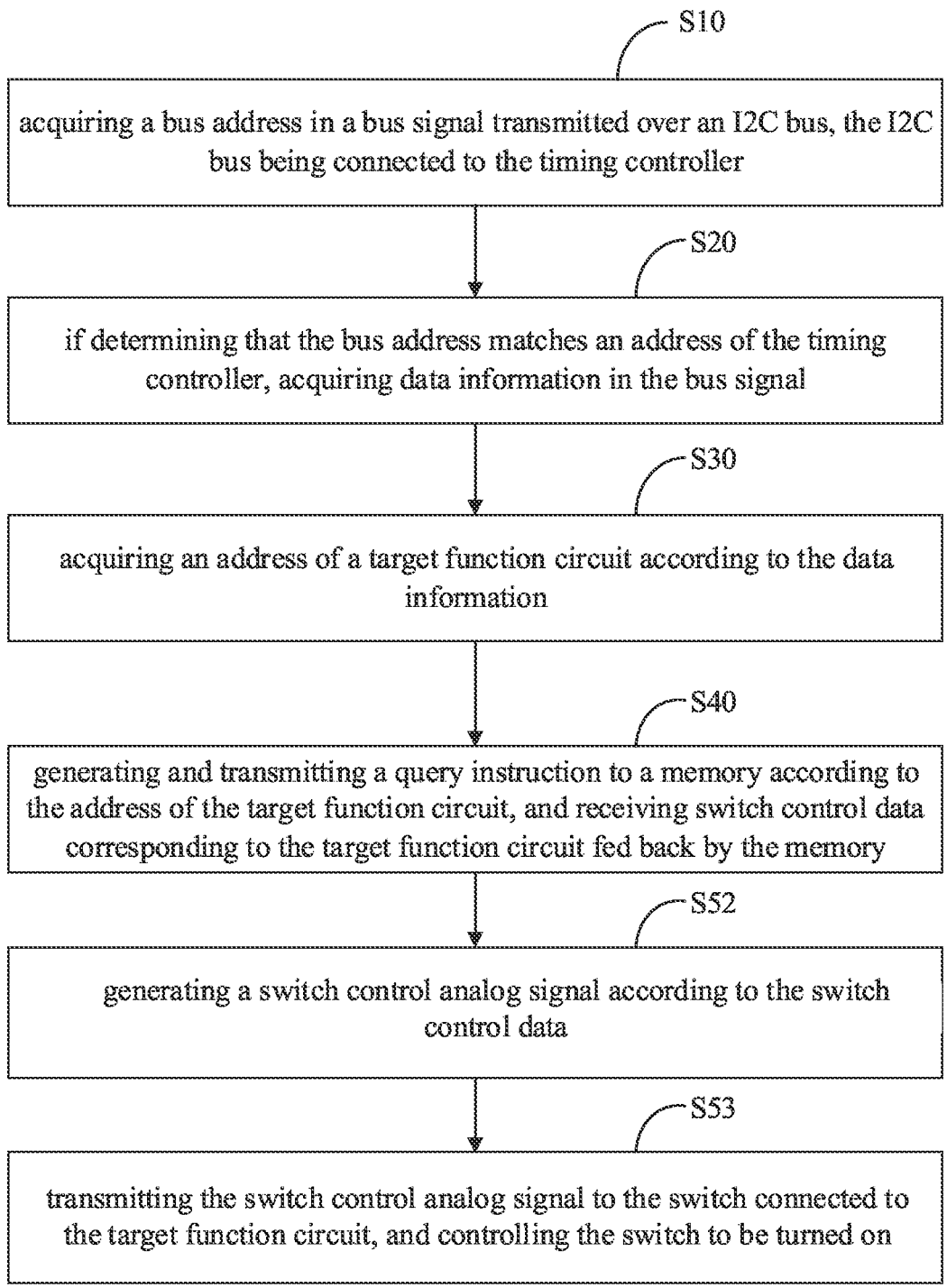
FIG. 6 is a flowchart illustrating a switch closing process for controlling a connection with a target function circuit according to switch control data according to another embodiment.

In one embodiment, as shown in FIG. 6, controlling the switch-off connection with the target function circuit according to the switch control data includes the following.

In S52, the switch control analog signal is generated according to switch control data.

In S53: the switch control analog signal is transmitted to the switch connected to the target function circuit, and the switch is controlled to be turned on.

After receiving the switch control data fed back by the memory, the data is converted into a switch control analog signal capable of controlling the analog amount of the switch state, so as to control the corresponding switch to be turned on. The switch may be a MOS transistor and has a small volume. For example, the switch connected to the Dither circuit may be a MOS transistor. The drain is connected to the Dither circuit, the source is connected to the memory, and the gate is used for receiving a switch control analog signal. The gate is turned on when a high-level switch control analog signal is received, and the Dither circuit acquires its corresponding operation parameter from the memory, and starts operating. It should be noted that, the switch may also be other types of electronic switches, such as transistors, and the connection mode adaptively adjusts with the switch type to ensure that the switch can be turned on after the corresponding switch control analog signal is received.

In one embodiment, the operation parameter of the function circuit includes the operation parameter of the overdrive circuit, the operation parameter of the precision color control circuit, and the operation parameter of the Dither circuit, and the switch control analog signal includes:

a first control signal, configured to control the first switch connected to the overdrive circuit to be turned on, so that the overdrive circuit acquires the operation parameter of the overdrive circuit from the memory;

a second control signal, configured to control the second switch connected to the precision color control circuit to be turned on, so that the precision color control circuit acquires the operation parameter of the precision color control circuit from the memory through the second switch;

a third control signal, configured to control the third switch connected to the Dither circuit to be turned on, so that the Dither circuit acquires the operation parameter of the Dither circuit from the memory through the third switch.

The function circuit includes the overdrive circuit, the precision color control circuit and the Dither circuit, and the switch includes the first switch, the second switch and the third switch.

The overdrive circuit is configured to modulate the data signal received by the timing controller, and the data signal is a signal for driving the display panel. The data signal modulated by the overdrive circuit can overdrive the liquid crystal to improve the response speed of the liquid crystal molecules. The precision color control circuit is a turned on-loop negative feedback amplification circuit, and is configured to control the amplitude of the chroma signal. The precision color control circuit detects the chroma synchronization signal as a standard for control, controls the amplitude of the chroma signal according to the magnitude of the chroma synchronization signal, and automatically changes the gain, so that the chrominance signal reaches a stable value. The Dither circuit may perform a random dither operation, which may improve the image reality of the digital display.

Specifically, in one specific embodiment, for three common function circuits in the timing controller, the switch control analog signal includes a first control signal, a second control signal and a third control signal that respectively controls the first switch, the second switch and the third switch. The first switch is a switch connected to the overdrive circuit, the second switch is a switch connected to the precision color control circuit, and the third switch is a switch connected to the Dither circuit. If determining that the address in the bus signal matches the address of the timing controller, the data information is further received, and the data information is parsed to obtain the address of the target function circuit. If the address is the address of the overdrive circuit, switch control data corresponding to the address is acquired from the memory, and a first control signal is generated according to the data. The first control signal is transmitted to the first switch, and the first switch is driven to be turned on, and the overdrive circuit obtains operating data thereof from the memory, and starts operating. For the same reason, if the object to be controlled is a precision color control circuit and a Dither circuit, the process for achieve control is the same as the overdrive circuit. If it is necessary to control the three function circuits to operate, that is, addresses of three target function circuits are generated according to the data information. Then, three switch control data are acquired by querying the memory. The first control signal, the second control signal and the third control signal are generated according to the three switch control analog signals. The first control signal, the second control signal and the third control signal are transmitted to the corresponding first switch, second switch and third switch sequentially. Only one switch is turned on at the same time, and the order of operating sequentially may be other than the order described in the above example. Other orders may also be possible.

In one embodiment, the query instruction includes the address of the target function circuit. The query instruction may include the address of the target function circuit, and after receiving the query instruction, the memory may obtain switch control data corresponding to the address of which function circuit to be queried by the query instruction, and provide a basis for searching the look-up table.

Figure 7:
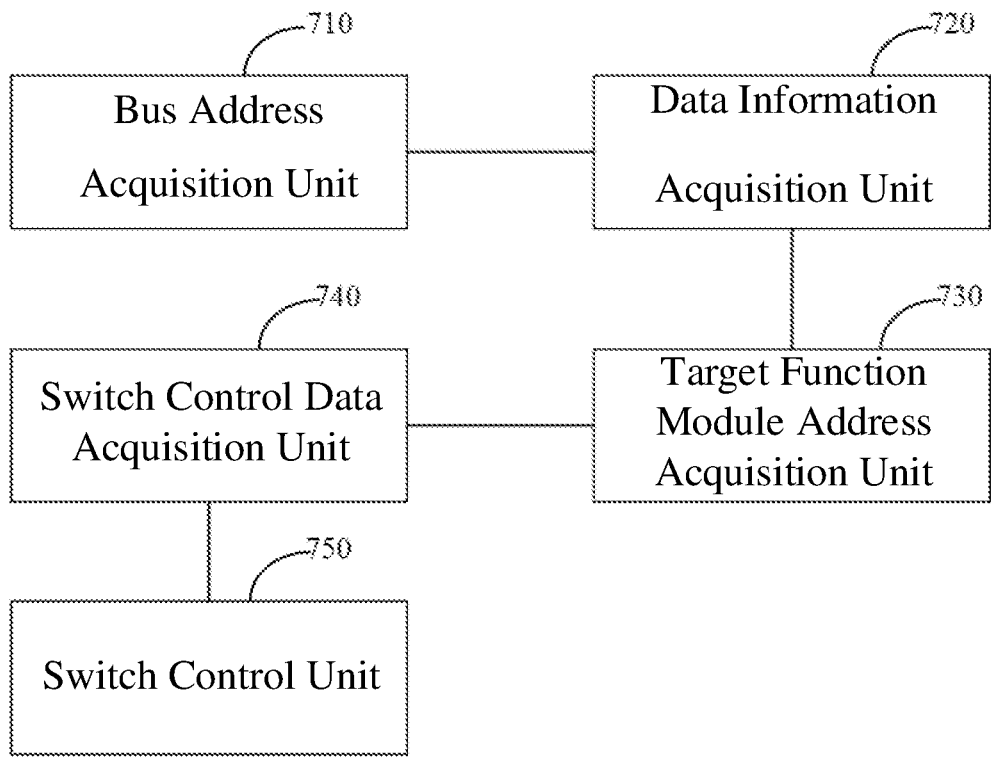
FIG. 7 is a schematic structural diagram of a timing controller control device according to an embodiment.

As shown in FIG. 7, an embodiment of the present disclosure further provides a device for controlling the timing controller control, including:

a bus address acquisition unit 710, configured to obtain a bus address in a bus signal transmitted over an I2C bus, and the I2C bus is connected to a timing controller;

a data information acquisition unit 720, configured to acquire data information in the bus signal when it is determined that the bus address matches the address of the timing controller.

a target function circuit address acquisition unit 730, configured to acquire an address of the target function circuit according to the data information;

a switch control data acquisition unit 740, configured to generate and transmit a query instruction to the memory according to the address of the target function circuit, and receive switch control data corresponding to the target function circuit fed back by the memory; and a switch control unit 750, configured to control, according to the switch control data, the switch connected to the target function circuit to be turned on, so that the target function circuit acquires the operation parameter of the target function circuit stored in the memory through the corresponding switch.

The timing controller is powered by the power supply circuit, the timing controller includes a plurality of function circuits, and the target function circuit is a controlled function circuit indicated by a bus signal.

The function circuits, switches and the like have the same interpretations as those in the above method for controlling a timing controller, and are not described herein.

Figure 8:
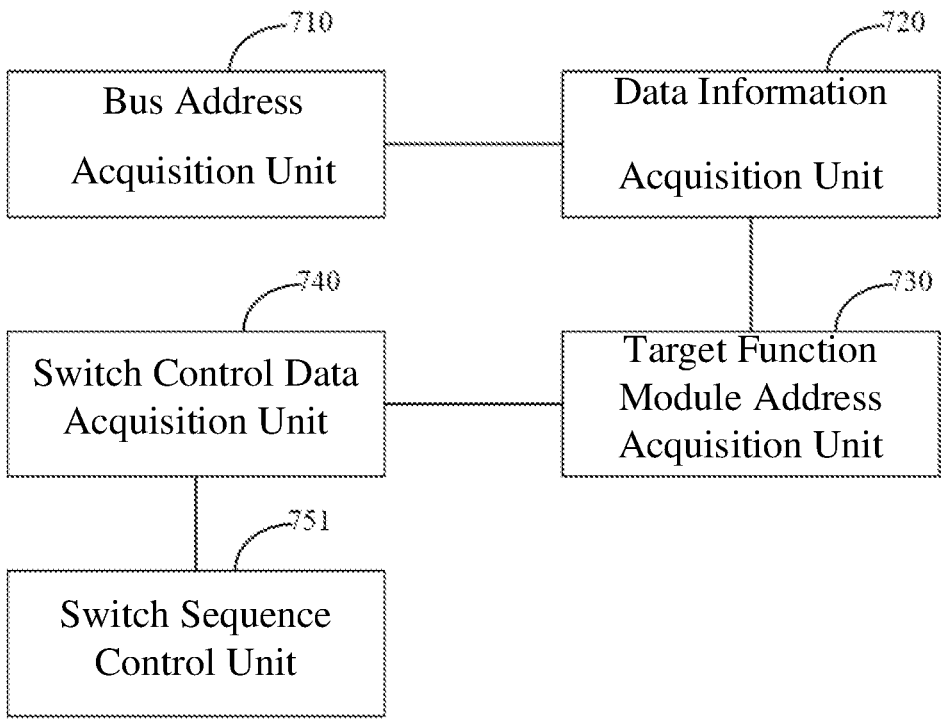
FIG. 8 is a schematic structural diagram of a timing controller control apparatus according to another embodiment.

In one embodiment, as shown in FIG. 8, the switch control unit 750 includes:

a switch sequence control unit 751, configured to, when a plurality of switch control data is received, switches connected to various target function circuits are controlled to be turned on sequentially according to each switch control data.

Figure 9:
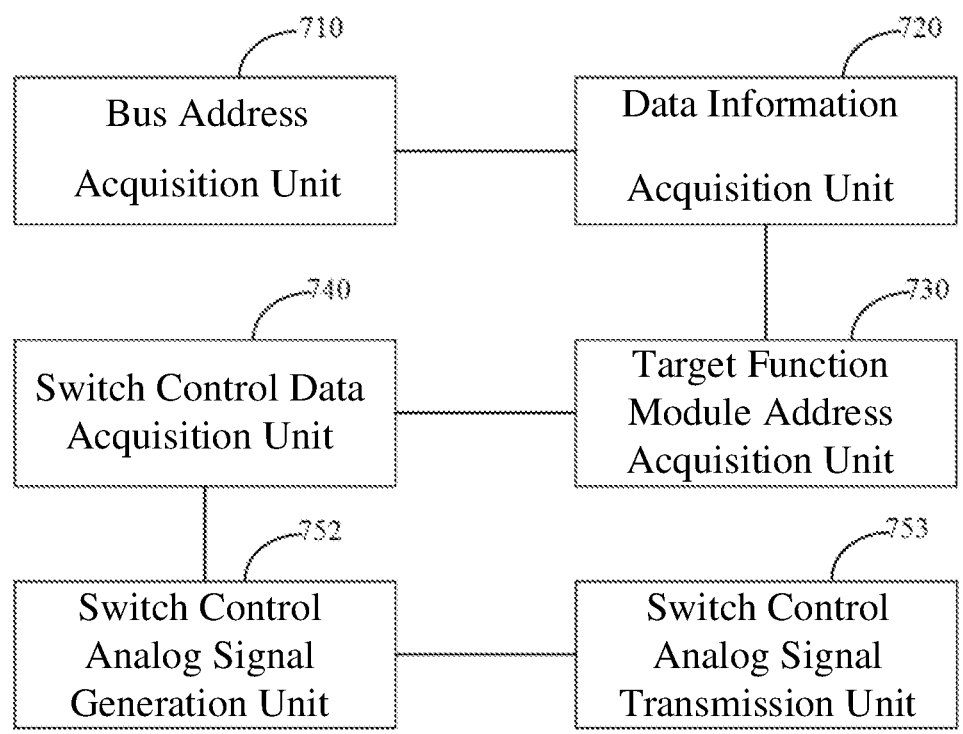
FIG. 9 is a schematic structural diagram of a timing controller control apparatus according to yet another embodiment.

In one embodiment, as shown in FIG. 9, the switch control unit 750 further includes:

a switch control analog signal generation unit 752, configured to generate a switch control analog signal according to the switch control data;

a switch control analog signal transmission unit 753, configured to transmit the switch control analog signal to the switch connected to the target function circuit to control the switch to be turned on.

Figure 10:
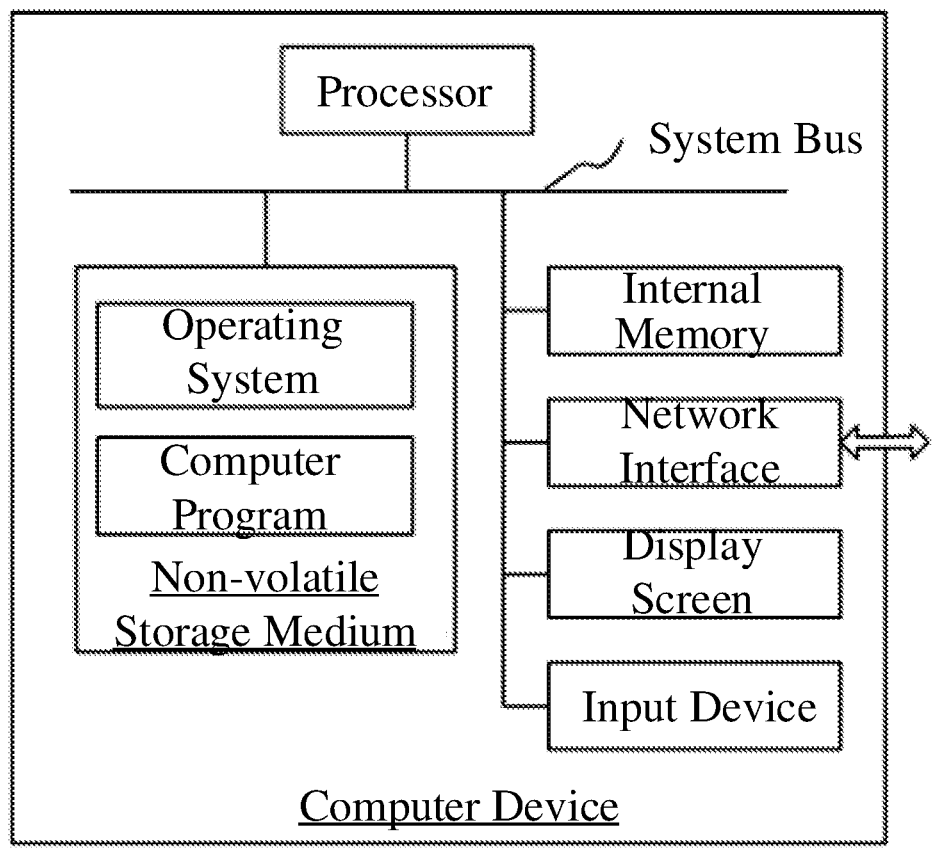
FIG. 10 is a schematic diagram of an internal structure of a computer device according to an embodiment.

In one embodiment, a computer device is provided, the computer device may be a terminal, and an internal structural diagram thereof may be shown in FIG. 10. The computer device includes a processor, a memory, a network interface, a display screen and an input device connected through a system bus. The processor of the computer device is configured to provide computing and control capabilities. The memory of the computer device includes non-volatile storage media, memory. The non-volatile storage medium stores an operating system and a computer program. The memory provides an environment for the operation system and the operation of the computer program in the non-volatile storage medium. The network interface of the computer device is configured to communicate with an external terminal through a network connection. The computer program is executed by the processor to implement a timing controller control method. The display screen of the computer device may be a liquid crystal display screen or an electronic ink display screen, and the input apparatus of the computer device may be a touch layer covered on the display screen, or may be a key, a trackball, or a touch pad disposed on a housing of the computer device, or may also be an external keyboard, a touch pad, a mouse, or the like.

A person skilled in the art would understand that the structure shown in FIG. 10 is merely a block diagram of a part of the structure related to the solution of the present disclosure, and does not constitute a limitation to the computer device to which the solution of the present disclosure is applied, and the specific computer device may include more or less components than those shown in the figure, or may combine some components, or have different component arrangements.

A computer device, including a memory and a processor. The memory stores a computer program, and the processor realizes the following processing when executing the computer program.

In S10, a bus address in a bus signal transmitted over an I2C bus is acquired, and the I2C bus is connected to a timing controller.

In S20, if determining that the bus address matches the address of the timing controller, data information in the bus signal is acquired.

In S30, an address of a target function circuit is acquired according to data information.

In S40, a query instruction is generated and transmitted to a memory according to the address of the target function circuit, and switch control data corresponding to the target function circuit fed back by the memory is received.

In S50, a switch connected to the target function circuit is controlled to be turned on according to the switch control data, so that an operation parameter of the target function circuit stored in the memory is acquired by the target function circuit through the corresponding switch.

The timing controller is powered by the power supply circuit, the timing controller includes a plurality of function circuits, and the target function circuit is a controlled function circuit indicated by a bus signal.

The computer device provided in the present disclosure can execute all the processes in the foregoing method embodiments. The computer device provided in the present disclosure can perform allocation of the operation of the function circuit after determining that the address of the bus matches the address of the timing controller. When there is an operation on the bus, the output voltage fluctuation of the power circuit caused by the incorrect operation of the timing controller is avoided, and the display stability is improved.

A computer readable storage medium having stored thereon a computer program is provided. When the computer program is executed by a processor, the following processing is implemented.

In S10, a bus address in a bus signal transmitted over an I2C bus is acquired, and the I2C bus is connected to a timing controller.

In S20, if determining that the bus address matches the address of the timing controller, data information in the bus signal is acquired.

In S30, an address of a target function circuit is acquired according to data information.

In S40, a query instruction is generated and transmitted to a memory according to the address of the target function circuit, and switch control data corresponding to the target function circuit fed back by the memory is received.

In S50, a switch connected to the target function circuit is controlled to be turned on according to the switch control data, so that an operation parameter of the target function circuit stored in the memory is acquired by the target function circuit through the corresponding switch.

The timing controller is powered by the power supply circuit, the timing controller includes a plurality of function circuits, and the target function circuit is a controlled function circuit indicated by a bus signal.

A person of ordinary skill in the art may understand that all or part of the processes of the method in the foregoing embodiments may be implemented by a computer program instructing relevant hardware. The computer program may be stored in a non-transitory computer readable storage medium. When the computer program is executed, the processes of the foregoing method embodiments may be implemented. Any reference to memory, storage, database or other media used in the embodiments provided by the present disclosure may include non-transitory and/or transitory memory. The non-transitory memory may include read-only memory (ROM), programmable ROM (PROM), electrically programmable ROM (EPROM), electrically erasable programmable ROM (EEPROM), or flash memory. The volatile memory may include a random access memory (RAM) or an external cache. By way of illustration and not limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

Figure 11:
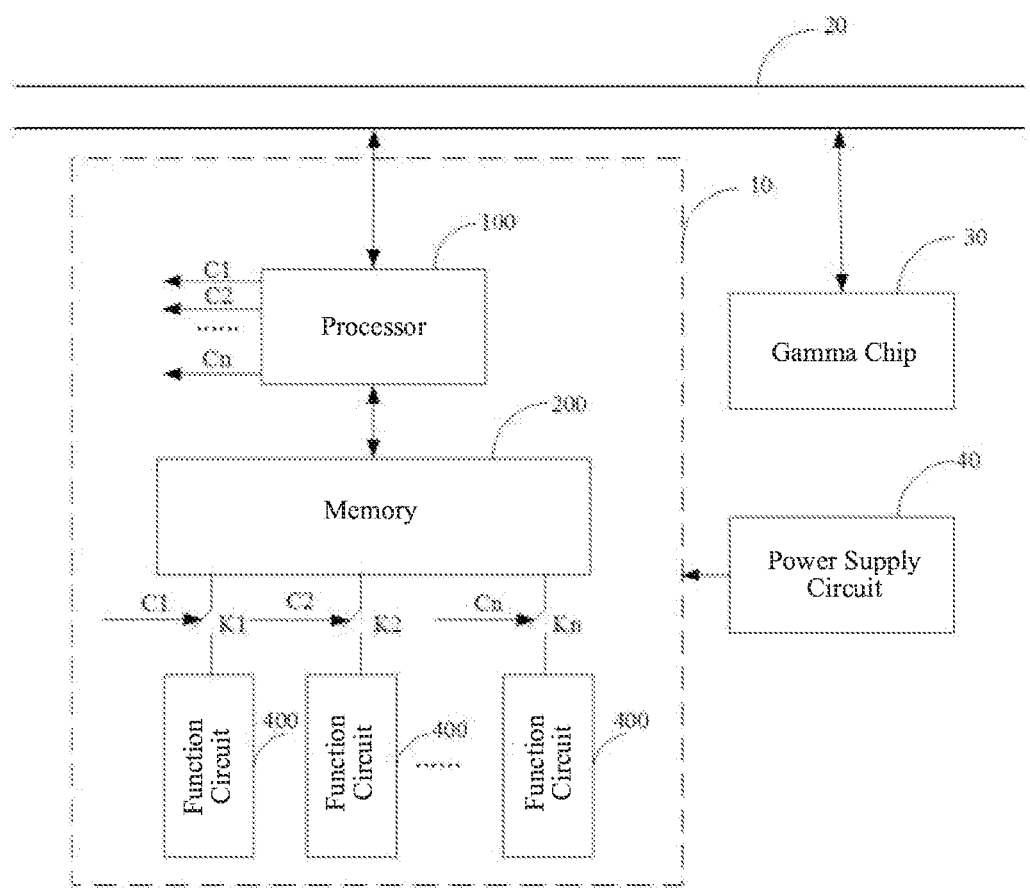
FIG. 11 is a schematic structural diagram of a timing controller and a drive circuit according to an embodiment.

On the other hand, as shown in FIG. 11, an embodiment of the present disclosure further provides a timing controller 10, including: a processor 100, a memory 200, a plurality of switches and a plurality of function circuits 400. The processor 100 and each of the function circuits 400 are connected to the power supply circuit 40.

The memory 200 stores switch control data for instructing to control the on or off state of each switch and the operation parameter of each function circuit 400.

The processor 100 is connected to a first access terminal of the memory 200.

Each function circuit 400 is connected to a second access terminal of the memory 200 through a one-to-one corresponding switch.

The processor 100 is configured to execute processing of the control method of the timing controller 10.

The function circuit 400, the switch, and the like have the same meanings as those in the method for controlling the timing controller 10, and will not be described herein. According to the timing controller 10 provided by the embodiment of the present disclosure, by integrating the processor 100 and other devices, whether the bus address in the bus signal on the bus 20 matches the timing controller 10 itself can be determined firstly, and if so, the next operation is performed. Specifically, the address of the target function circuit 400 is generated according to the data information in the bus signal, and a query instruction is further generated according to the address of the target function circuit 400. The switch control data corresponding to the address of the target function circuit 400 is acquired by querying the memory 200, and then the switch connected to the target function circuit 400 is controlled to be turned on according to the switch control data, so that the target function circuit 400 starts to operate. The fluctuation of the output voltage of the power supply circuit 40 caused by mistakenly triggering the timing controller 10 is avoided, and the display stability and quality are improved.

Figure 12:
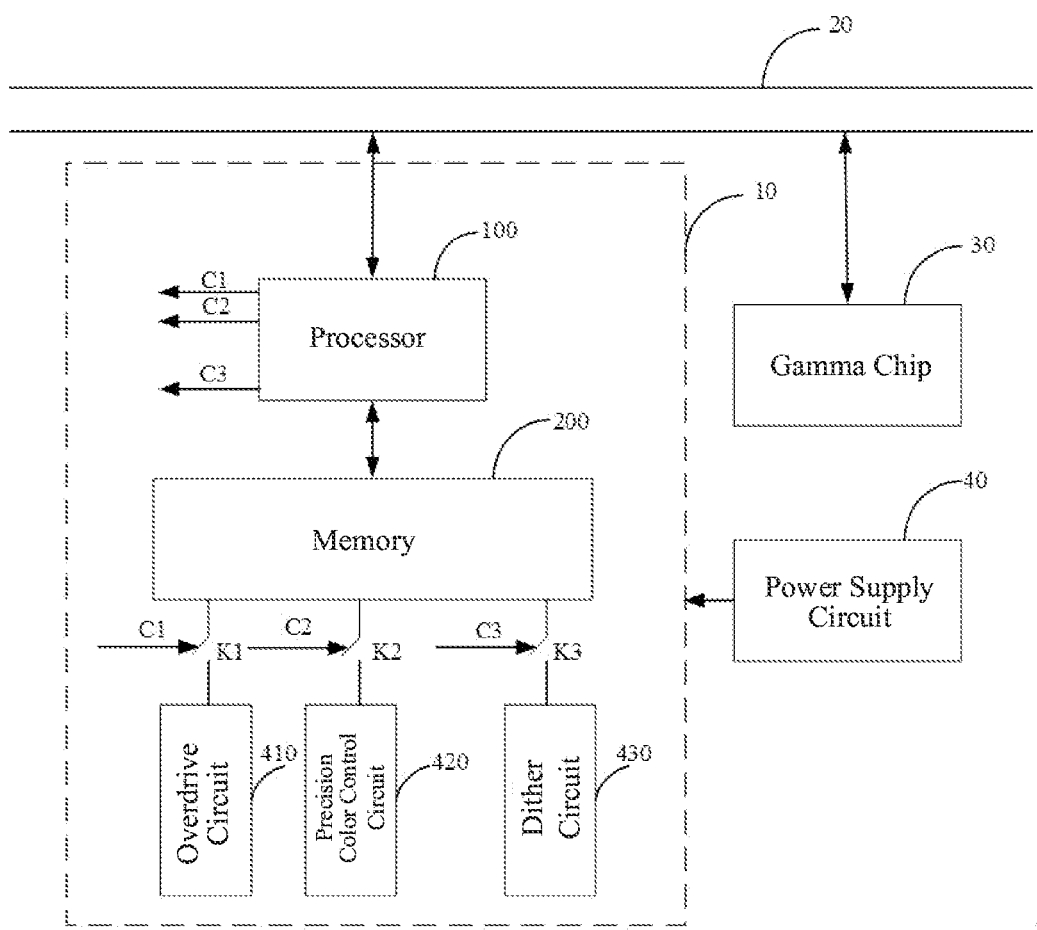
FIG. 12 is a schematic structural diagram of a timing controller and a drive circuit according to another embodiment.

In one embodiment, as shown in FIG. 12, the processor 100 is configured to generate a switch control analog signal according to the switch control data, transmit the switch control analog signal to the switch connected to the target function circuit 400, and control the switch to be turned on. The operation parameters of the function circuit include the operation parameter of the overdrive circuit 410, the operation parameter of the precision color control circuit 420 and the operation parameter of the Dither circuit 430. The switch control analog signals (C1, C2, . . . , Cn) include a first control signal C1, a second control signal C2 and a third control signal C3, and the switch includes:

a first switch K1, a first terminal of which is connected to a second access terminal of the memory 200;

a second switch K2, a first terminal of which is connected to a second access terminal of the memory 200;

a third switch K3, a first terminal of which is connected to a second access terminal of the memory 200;

The function circuit includes:

an overdrive circuit 410, an input terminal of the overdrive circuit 410 being connected to a second terminal of the first switch K1;

a precision color control circuit 420, an input terminal of the precision color control circuit 420 being connected to a second terminal of the second switch K2;

a Dither circuit 430, an input terminal of the Dither circuit 430 being connected to a second terminal of the third switch K3.

The processor is configured to control the first switch K1 to be turned on according to the first control signal C1, and configured to control the second switch K2 to be turned on according to the second control signal C2, and further configured to control the third switch K3 to be turned on according to the third control signal C3.

The first switch K1, the second control signal and the like have the same interpretations as those in the foregoing method embodiments, and are not described again herein. The switching states of the switches (K1, K2, K3, . . . , Kn) can be individually controlled by means of one-to-one correspondence between the respective control signals (C1, C2, . . . , Cn) and the respective switches. When it is required to control a plurality of function circuits, the respective function circuits can be controlled sequentially, and one switch can be turned on at a same time, thereby avoiding fluctuation of the output voltage of the power supply circuit 40 caused by the operation of the timing controller and improving the display quality.

In one embodiment, each switch (K1, K2, K3, . . . , Kn) is a MOS transistor. The drain of the switch is connected to the corresponding function circuit, the source of the switch is connected to the memory, and the gate of the switch is connected to the processor, and is used for receiving the switch to control an analog signal. The MOS transistor is used as a switch, which has a small volume and is beneficial to realize a narrow frame design of a display device.

A drive circuit, as shown in FIGS. 11 and 12, including: the timing controller 10 described above, a gamma chip 30 and a power supply circuit 40. The gamma chip 30 is connected to an I2C bus 20. The power supply circuit 40 is connected to the timing controller 10 and configured to provide a power supply voltage to the timing controller 10.

According to the drive circuit provided by the embodiment of the present disclosure, the gamma chip 30 and the timing controller 10 are both connected to the I2C bus 20, the power supply circuit 40 supplies power to the timing controller 10. In this way, the incorrect operation of the timing controller 10 when operating the gamma chip 30 is avoided, and thus avoiding the internal function circuits of the timing controller 10 being all operated, which causes the fluctuation of the output voltage of the power supply circuit 40. With the timing controller 10 provided in the above embodiment, it is first determined whether the address in the bus signal matches the address of the timing controller 10, and if the address in the bus signal matches the address of the timing controller 10, the next operation is performed. The address of the target function circuit that needs to be controlled is obtained according to the data information in the bus signal, and then a look-up table searched or the like according to the address. The switch control data corresponding to the target function circuit is obtained from the memory 200, and the switch corresponding to the target function circuit is controlled to be turned on according to the data, and the target function circuit obtains the operation parameter from the memory 200 and starts operating.

Figure 13:
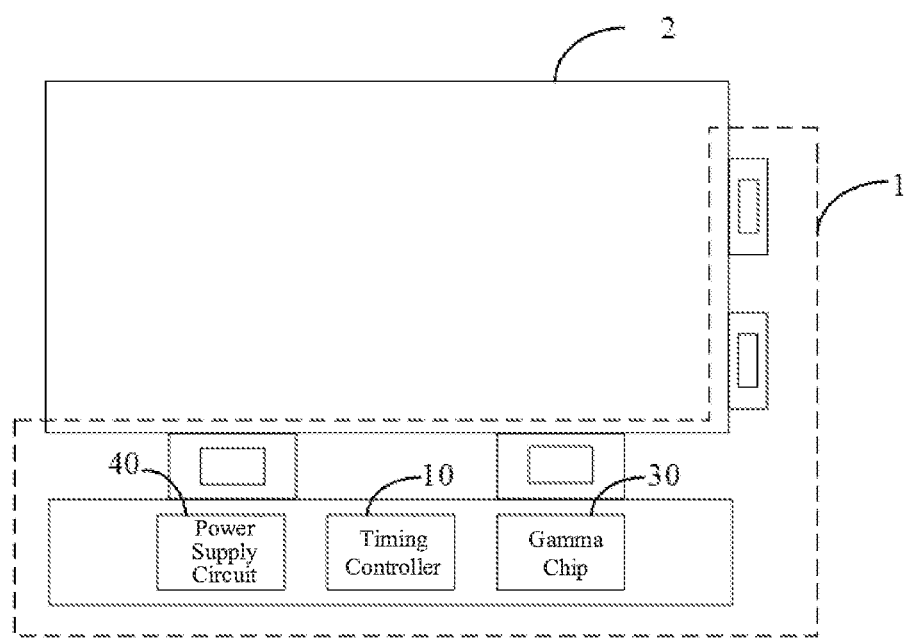
FIG. 13 is a structural schematic diagram of a display device according to an embodiment.

A display device, as shown in FIG. 13, including: a display panel 2, the drive circuit 1 described above, and the drive circuit 1 for driving the display panel 2 to display.

The display device provided by the embodiment of the present disclosure includes the above-described drive circuit 1, which can ensure that when there is an operation on the bus, the output voltage of the power supply circuit 40 is stabilized and there is no fluctuation phenomenon, thereby ensuring that each device operates stably and the display effect is stabilized.

The technical features of the described embodiments can be combined arbitrarily, and in order to briefly describe the description, all possible combinations of the technical features in the described embodiments are not described; however, as long as the combination of these technical features does not have any contradiction, it should be considered to be the scope of disclosure disclosed in the present description.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the concept of the present disclosure, which all belong to the scope of protection of the present disclosure. Therefore, the scope of protection of the present disclosure should be regarded by the appended claims.

What is claimed is:

1. A method for controlling a timing controller comprising a plurality of function circuits and powered by a power supply circuit, the method comprising:
   acquiring a bus address in a bus signal transmitted over an I2C bus, the I2C bus configured to be connected to the timing controller;
   acquiring data information in the bus signal when determining that the bus address matches an address of the timing controller, wherein determining that the bus address matches an address of the time controller comprises determining whether valid bit data other than a starting bit in data in the signal transmitted over the bus for addressing is consistent with data corresponding to the address of the timing controller;
   acquiring an address of a target function circuit according to the data information;
   generating and transmitting a query instruction to a memory according to the address of the target function circuit, and receiving switch control data corresponding to the target function circuit fed back by the memory;
   controlling, according to the switch control data, a switch connected to the target function circuit to be turned on, so that the target function circuit acquires operation parameters of the target function circuit stored in the memory through the corresponding switch;
   wherein the target function circuit is a controlled function circuit indicated by the bus signal.

2. The method for controlling the timing controller according to claim 1, wherein acquiring an address of a target function circuit according to the data information comprises:
   acquiring a data information part in the bus signal, and parsing the data information part to convert the bus signal into an address identifiable inside the timing controller.

3. The method for controlling the timing controller according to claim 1, wherein controlling, according to the switch control data, a switch connected to the target function circuit to be turned on comprises:
   if a plurality of the switch control data is received, controlling switches connected to various target function circuit to be turned on sequentially according to each of the switch control data.

4. The method for controlling the timing controller according to claim 1, wherein the switch control data is stored in a look-up table, and the look-up table represents a corresponding relationship between an address of each function circuit and the switch control data.

5. The method for controlling the timing controller according to claim 4, wherein the look-up table stores the corresponding relationship between the address of each function circuit and the switch control data.

6. The method for controlling the timing controller according to claim 4, wherein the look-up table stores a predefined corresponding relationship between a number of each function circuit and the switch control data.

7. The method for controlling the timing controller according to claim 1, wherein controlling, according to the switch control data, a switch connected to the target function circuit to be turned on comprises:
   generating a switch control analog signal according to the switch control data;
   transmitting the switch control analog signal to the switch connected to the target function circuit, and controlling the switch to be turned on.

8. The method for controlling the timing controller according to claim 7, wherein the operation parameters of the function circuit comprise an operation parameter of an overdrive circuit, an operation parameter of a precision color control circuit and an operation parameter of a Dither circuit, and the switch control analog signal comprises:
   a first control signal, configured to control a first switch connected to the overdrive circuit to be turned on, so that the overdrive circuit acquires the operation parameter of the overdrive circuit from the memory;
   a second control signal, configured to control a second switch connected to the precision color control circuit to be turned on, so that the precision color control circuit acquires the operation parameter of the precision color control circuit from the memory through the second switch; and
   a third control signal, configured to control a third switch connected to the Dither circuit to be turned on, so that the Dither circuit acquires the operation parameter of the Dither circuit from the memory through the third switch;
   the function circuit comprise the overdrive circuit, the precision color control circuit and the Dither circuit, and the switches comprise the first switch, the second switch and the third switch.

9. The method for controlling the timing controller according to claim 1, wherein the query instruction comprises the address of the target function circuit.

10. The method for controlling the timing controller according to claim 1, wherein the switch is a MOS transistor.

11. The method for controlling the timing controller according to claim 1, wherein the power supply circuit is a pulse width modulation chip power supply.

12. A timing controller configured to connect to an I2C bus, comprising: a processor, a memory, a plurality of switches and a plurality of function circuit; the processor and each of the function circuit are configured to be connected to a power supply circuit;
   the memory stores switch control data for instructing to control an on or off state of each switch and an operation parameter of each function circuit;
   the processor is connected to a first access terminal of the memory;
   each function circuit is connected to a second access terminal of the memory through a one-to-one corresponding switch;
   the processor is configured to execute following processing:
   acquiring a bus address in a bus signal transmitted over an I2C bus, the I2C bus being connected to the timing controller;
   acquiring data information in the bus signal when determining that the bus address matches an address of the timing controller, wherein determining that the bus address matches an address of the timing controller comprises determining whether valid bit data other than a starting bit in data in the signal transmitted over the bus for addressing is consistent with data corresponding to the address of the timing controller;
   acquiring an address of a target function circuit according to the data information;
   generating and transmitting a query instruction to the memory according to the address of the target function circuit, and receiving switch control data corresponding to the target function circuit fed back by the memory;
   controlling, according to the switch control data, the switch connected to the target function circuit to be turned on, so that the target function circuit acquires operation parameters of the target function circuit stored in the memory through the corresponding switch;

wherein the target function circuit is a controlled function circuit indicated by the bus signal.

13. The timing controller according to claim 12, wherein the processor is configured to generate a switch control analog signal according to the switch control data, transmit the switch control analog signal to the switch connected to the target function circuit, and control the switch to be turned on; the operation parameters of the function circuit comprise an operation parameter of an overdrive circuit, an operation parameter of a precision color control circuit, and an operation parameter of a Dither circuit, the switch control analog signal comprises a first control signal, a second control signal, and a third control signal, and the switches comprise:

a first switch, a first terminal of the first switch being connected to a second access terminal of the memory;

a second switch, a first terminal of the second switch being connected to the second access terminal of the memory;

a third switch, a first terminal of the third switch being connected to the second access terminal of the memory;

the function circuit comprise:

an overdrive circuit, an input terminal of the overdrive circuit being connected to a second terminal of the first switch;

a precision color control circuit, an input terminal of the precision color control circuit being connected to a second terminal of the second switch;

a Dither circuit, an input terminal of the Dither circuit being connected to a second terminal of the third switch;

the processor is configured to control the first switch to be turned on according to the first control signal, and is configured to control the second switch to be turned on according to the second control signal, and is further configured to control the third switch to be turned on according to the third control signal.

14. The timing controller according to claim 13, wherein each of the switches is a MOS transistor; a drain of the switch is connected to a corresponding function circuit; a source of the switch is connected to the memory; a gate of the switch is connected to the processor, and is configured to receive the switch control analog signal.

15. The timing controller according to claim 12, wherein when a plurality of the switch control data is received, the processor is further configured to execute: controlling switches connected to various target function circuit to be turned on sequentially according to each of the switch control data.

16. The timing controller according to claim 12, wherein the memory further stores a look-up table, the switch control data is stored in the look-up table, and the look-up table represents a corresponding relationship between an address of each function circuit and the switch control data.

* * * * *